(12) United States Patent
Kennedy et al.

(10) Patent No.: US 9,971,400 B2
(45) Date of Patent: May 15, 2018

(54) DEVICE AND METHOD FOR EYE TRACKING DATA TRIGGER ARRANGEMENT

(75) Inventors: Ben Kennedy, Basingstoke (GB); David T. Lundquist, Stony Brook, NY (US); James Morley-Smith, High Wycombe (GB)

(73) Assignee: Symbol Technologies, LLC, Holtsville, NY (US)

( * ) Notice: Subject to any disclaimer, the term of this patent is extended or adjusted under 35 U.S.C. 154(b) by 146 days.

(21) Appl. No.: 13/537,338

(22) Filed: Jun. 29, 2012

(65) Prior Publication Data
US 2014/0002343 A1    Jan. 2, 2014

(51) Int. Cl.
G09G 5/00      (2006.01)
G03B 17/00     (2006.01)
G06F 3/01      (2006.01)
G06F 3/038     (2013.01)
G02B 27/00     (2006.01)

(52) U.S. Cl.
CPC ......... G06F 3/013 (2013.01); G02B 27/0093 (2013.01); G06F 3/038 (2013.01); G06F 2203/0381 (2013.01)

(58) Field of Classification Search
CPC . G02B 27/01; G02B 27/0093; G02B 2027/01
USPC .................................. 345/7–9, 156
See application file for complete search history.

(56) References Cited

U.S. PATENT DOCUMENTS

| 5,517,021 | A | 5/1996 | Kaufman et al. | |
|---|---|---|---|---|
| 6,172,657 | B1 | 1/2001 | Kamakura et al. | |
| 2004/0174497 | A1* | 9/2004 | Sharma | G06F 3/013 351/210 |
| 2006/0110008 | A1 | 5/2006 | Vertegaal et al. | |
| 2006/0208085 | A1* | 9/2006 | Cohen et al. | 235/472.01 |
| 2008/0080846 | A1* | 4/2008 | Grip | 396/51 |
| 2010/0149073 | A1* | 6/2010 | Chaum et al. | 345/8 |

(Continued)

FOREIGN PATENT DOCUMENTS

| EP | 1696363 A2 | 8/2006 |
|---|---|---|
| WO | 2014004058 | 1/2014 |

OTHER PUBLICATIONS

"Tobii Glasses Eye Tracker," accessed at http://www.tobii.com/en/eye-tracking-research/global//en/analysis-and -research/global/products/hardware/tobii-glasses-eyetracker/ last accessed on Mar. 3, 2011, p. 1.

(Continued)

*Primary Examiner* — Amit Chatly

(57) ABSTRACT

A system and method tracks a user's eye for a data trigger arrangement. The method includes obtaining first image data within a first vision field of a first data capturing sensor. The method includes determining a first area viewed by a user's eye as a function of the first image data. The method includes obtaining second image data within a second vision field of a second sensor. The method includes determining a second area captured within the second field of vision as a function of the second image data. The method includes determining disposition data of the first area within the second area. When a trigger command is captured, the method includes data capturing a machine readable representation of data (MRRoD) using the second sensor as a function of the disposition data.

19 Claims, 4 Drawing Sheets

(56) References Cited

U.S. PATENT DOCUMENTS

| | | |
|---|---|---|
| 2011/0001695 A1* | 1/2011 | Suzuki et al. ............... 345/156 |
| 2011/0019001 A1 | 1/2011 | Rhoads et al. |
| 2011/0026777 A1 | 2/2011 | Rhoads et al. |
| 2012/0019645 A1* | 1/2012 | Maltz ............................ 348/78 |
| 2014/0002343 A1 | 1/2014 | Kennedy et al. |

OTHER PUBLICATIONS

Chau, M., and Betke, M., "Real Time Eye Tracking and Blink Detection with USB Cameras," May 12, 2005, pp. 10 accessed at http://www.cs.bu.edu/techreports/pdf/2005-012-blink-detection.pdf.

Li, D., and Parkhurst, D. J., "Starburst: A robust algorithm for video-based eye tracking," Sep. 5, 2005, pp. 22 accessed at http://thirtysixthspan.com/openEyes/starburst.pdf.

International Search Report and Written Opinion for counterpart International Patent Application No. PCT/US2013/044900 dated Nov. 21, 2013.

Office Action dated Sep. 4, 2015 in related Canada patent application 2,876,412.

Notice of Preliminary Rejection dated Oct. 29, 2015 in related Korea application 10-2014-7036141.

\* cited by examiner

DEVICE AND METHOD FOR EYE TRACKING DATA TRIGGER ARRANGEMENT

FIELD OF THE DISCLOSURE

The present disclosure relates generally to a device and method for an eye tracking data trigger arrangement and more particularly to activating a sensor to capture a machine readable representation of data (MRRoD) in a hands-free mode.

BACKGROUND

An electronic device may incorporate a variety of different input technologies. For example, the electronic device may include a keypad to allow a user to enter inputs. When data is captured by the electronic device, a further variety of different input technologies may be utilized. For example, a barcode may be associated with a plurality of digits displayed with the barcode (e.g., underneath the barcode itself). Using the keypad, the digits may be entered and the barcode associated with the digits may be retrieved. In another example, a conventional scanning device may be utilized. However, the conventional scanning device requires the user to hold the device in order to properly capture the data in the MRRoD.

The conventional scanning device further requires the user to manually perform the data capture. Specifically, the user must hold the device, aim the device, trigger the data capture functionality, and release the device, for example, to free up the user's hands. Accordingly, the scanning device includes a handle configured for the user to hold the device; the user must physically aim the device so that the data can be captured; the user must usually depress a triggering component on the device to activate the data capture functionality and release the component after performing a scan (or depress and release the triggering component for the data capture functionality to be activated); and at least one hand of the user must be used in this process. When the conventional scanning device is stationary, the user is still required to manually position the MRRoD in relation to the scanning device for the data capture functionality to be used. In addition, the scanning device may include a field of vision to capture the data of the MRRoD. However, there may be times when multiple MRRoDs are present within the field of vision of the scanning device, thereby leading to incorrect data captures, inability to capture data, etc.

Accordingly, there is a need for a device and method for triggering a data capture functionality in a hands-free manner and more naturally in terms of a human computer interaction.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
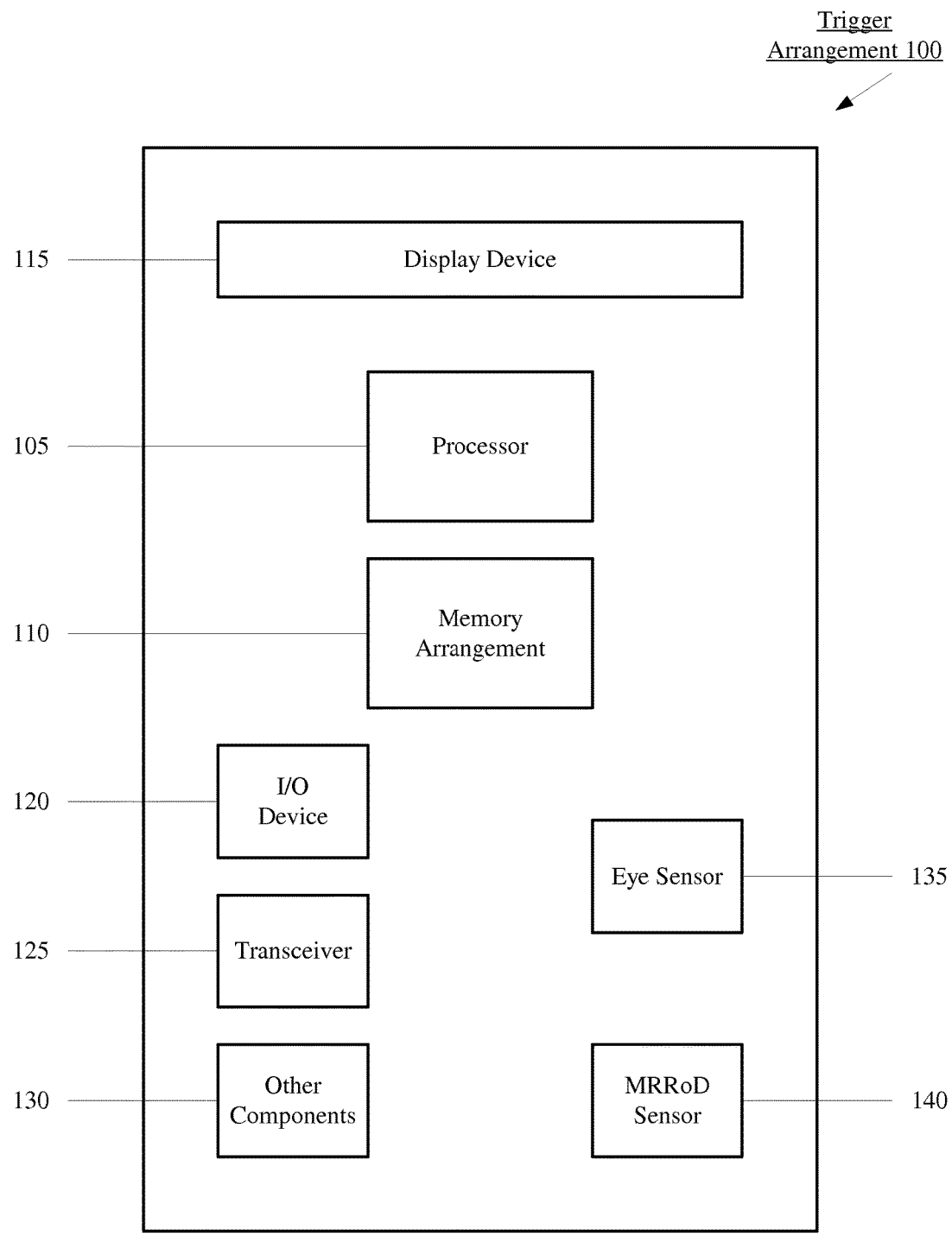
FIG. 1 is a block diagram of the components of a trigger arrangement in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention describes a device and method for an eye tracking data trigger arrangement. The method comprises obtaining first image data within a first vision field of a first data capturing sensor; determining a first area viewed by a user's eye as a function of the first image data; obtaining second image data within a second vision field of a second sensor; determining a second area captured within the second field of vision as a function of the second image data; determining disposition data of the first area within the second area; and when a trigger command is captured, data capturing a machine readable representation of data (MRRoD) using the second sensor as a function of the disposition data.

The exemplary embodiments may be further understood with reference to the following description and the appended drawings, wherein like elements are referred to with the same reference numerals. The exemplary embodiments describe an electronic device configured to trigger a data capture functionality to provide a more natural human computer interface. Specifically, using an eye tracking sensor to detect gestures of a user's eye, a data capture sensor may be activated to capture data encoded in a MRRoD. The trigger arrangement, the data capture functionality, the interface, the eye tracking sensor, the data capture sensor, the MRRoD, and a related method will be discussed in further detail below.

FIG. 1 is a trigger arrangement 100 in accordance with an exemplary embodiment of the present invention. As will be discussed in further detail below, the trigger arrangement 100 may be incorporated with any electronic device or mount. The electronic device may be any portable device such as a mobile phone, a personal digital assistant, a smartphone, a tablet, a laptop, a mounted device (e.g., head, wrist, etc.), etc. The mount may be any device configured to be worn by the user such as on the head of the user, the wrist of the user, etc. However, it should be noted that the electronic device may also be stationary and the exemplary embodiments are further configured for use with stationary devices (e.g., a video feed on a static monitor). The trigger arrangement 100 is shown in FIG. 1 as a plurality of components in a common housing such as the housing of the electronic device. However, it should be noted that the components of the trigger arrangement 100 may be separate from each other. In such an embodiment, the components may be configured to exchange data to provide the functionalities as will be described in further detail below. As illustrated in FIG. 1, the trigger arrangement 100 may include a processor 105, a memory arrangement 110, a display device 115, an input/output (I/O) device 120, a transceiver 125, other components 130 such as a portable power supply (e.g., a battery), an eye sensor 135, and a data capture sensor 140.

The processor 105 may provide conventional functionalities for the trigger arrangement 100. In a specific example according to the exemplary embodiments of the present invention, the trigger arrangement 100 may include a plurality of applications that are executed on the processor 105 such as an application related to identifying products with data encoded in a MRRoD. The memory 110 may also provide conventional functionalities for the trigger arrangement 100. For example, the memory 110 may store data related to operations performed by the processor 105. As will be described in further detail below and in a specific example according to the exemplary embodiments of the present invention, the memory 110 may also store the data captured by the eye sensor 135 and the data capture sensor 140. Furthermore, the memory 110 may store gestures captured by the eye sensor 135 and the functionality associated with the eye gesture.

The display device 115 may be any component configured to show data to a user. The display device 115 may be, for example, a liquid crystal display (LCD) to conform to the size of the electronic device in which the trigger arrangement 100 is incorporated. The I/O device 120 may be any component configured to receive an input from the user. For example, the I/O device 120 may be a keypad (e.g., alphanumeric keypad, numeric keypad, etc.). The I/O device 120 may also be a touch sensing pad for a user to enter inputs manually with a finger(s) or a stylus. It should be noted that the display device 115 may also incorporate the I/O device 120, particularly when the I/O device 120 is a touch sensing pad including an area in which the user may enter inputs. In another example, the I/O device 120 may be a transparent touch sensor placed on top of the display 115 that enables a user to enter inputs. The transceiver 125 may provide the trigger arrangement 100 with a means to exchange data with a communications network. Furthermore, when the trigger arrangement 100 includes separated components, the transceiver 125 may be used to exchange data between the components. The other components 130 may include any further component such as those conventionally found in electronic devices.

The eye sensor 135 may be any component configured to capture data related to a gesture associated with the eye of the user. Accordingly, the eye sensor 135 may be oriented to face the eye of the user or oriented so that a field of vision of the eye sensor 135 is able to include the eye of the user. The eye sensor 135 may be any type of sensor such as a camera to capture an image of the eye, a motion sensing device, etc. The data capture sensor 140 may also be any component configured to capture data. However, the data capture sensor 140 may be specifically configured to capture data included in a MRRoD. The data capture sensor 140 may be a "field of vision" dimensional sensing device such as a 2-dimensional camera, a 3-dimensional camera, a 2-dimensional radio frequency identification (RFID)/near field communication (NFC) positional sensor, a scanning device (e.g., 2-dimensional barcode scanner, 3-dimensional barcode scanner, etc.), etc. The data capture sensor 140 may be oriented in a manner respective to the electronic device or mount in which the trigger arrangement 100 is incorporated. For example, when the eye sensor 135 faces the user, the data capture sensor 140 may be oriented so that the field of vision of the data capture sensor 140 extends in a direction opposite the eye sensor 135. In another example, when the eye sensor 135 is configured with a field of vision to extend perpendicularly to the user's field of vision, the data capture sensor 140 may be oriented so that the field of vision of the data capture sensor is perpendicular to the eye sensor 135. In yet another example, the data capture sensor 140 may be oriented so that the field of vision of the data capture sensor 140 always coincides with the field of vision of the user.

Figure 2B:
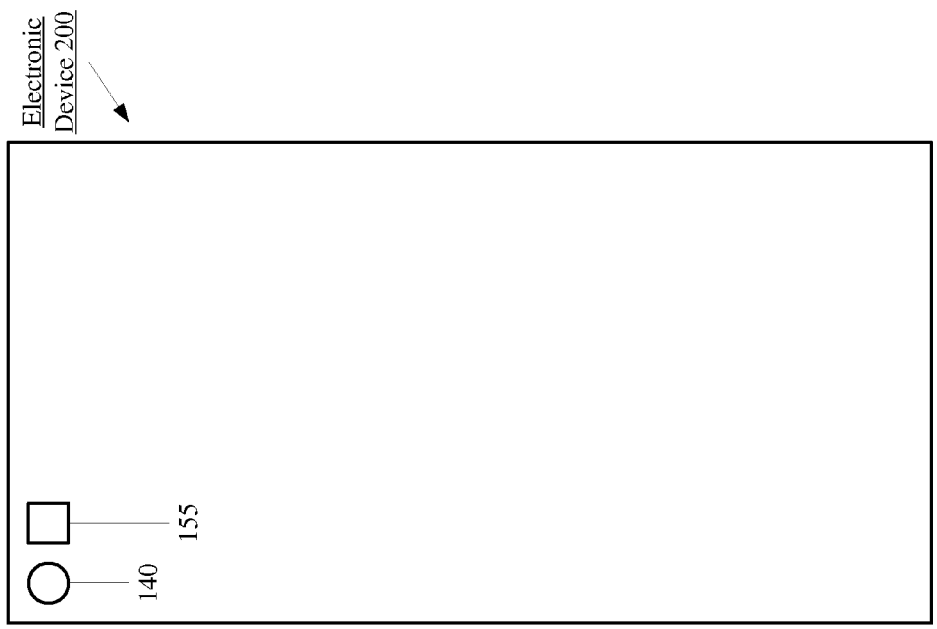
FIG. 2B is a rear side of the electronic device of FIG. 2A in accordance with some embodiments.
Figure 2A:
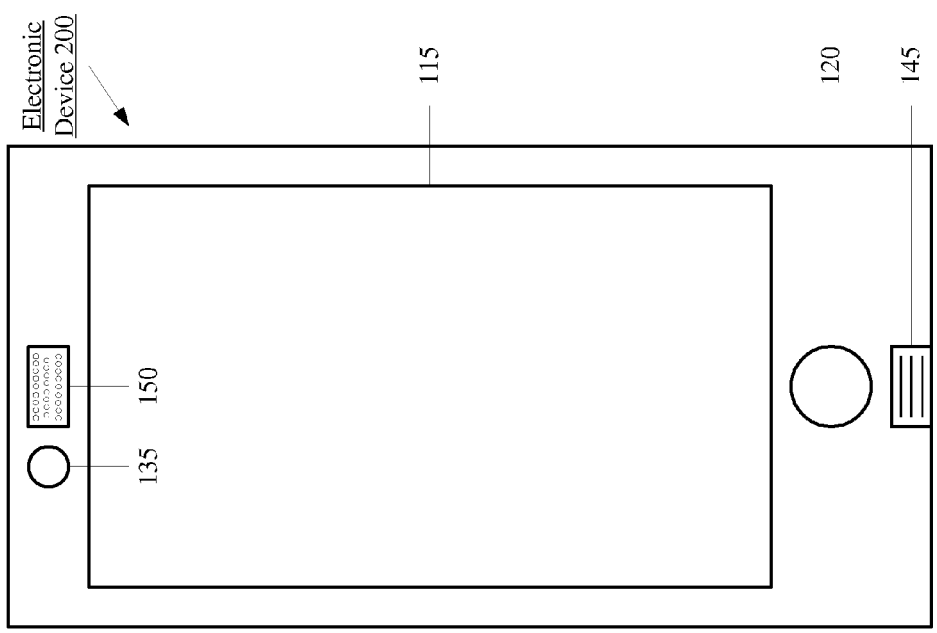
FIG. 2A is a front side of an electronic device incorporating the trigger arrangement of FIG. 1 in accordance with some embodiments.

FIGS. 2A and 2B show an electronic device 200 incorporating the trigger arrangement 100 of FIG. 1 in accordance with some embodiments. Specifically, FIG. 2A is a front side of the electronic device 200 while FIG. 2B is a rear side of the electronic device 200. As discussed above, the electronic device 200 may be any device. Specifically, the electronic device 200 may be a tablet. The electronic device 200 may include the components described above for the triggering arrangement 100 such as the processor 105, the memory 110, the display device 115, the I/O device 120, etc. Furthermore, the electronic device 200 may include other components such as an audio receiving component 145 such as a microphone, an audio transmitting component 150 such as a speaker, and a lighting component 155 such as a camera flash. As will be described in further detail below, the electronic device 200 may be configured so that components thereof are adapted with the features and functionalities of the triggering arrangement 100. Accordingly, the electronic device 200 may include a front facing camera that is configured as the eye sensor 135 and a rear facing camera that is configured as the data capture sensor 140.

Conventional tablet devices may include a front facing camera and a rear facing camera. Those skilled in the art will understand that these cameras may be used for a variety of different purposes. For example, a picture capturing application may allow the user to select a camera to capture an image. In another example, a video telephone application may allow the user to utilize the front facing camera to allow for a face to face telephone conversation to proceed. The exemplary embodiments of the present invention may adopt and configure already existing cameras as the eye sensor 135 and the data capture sensor 140. However, it should be noted that the electronic device 200 may further include the eye sensor 135 and the data capture sensor 140 as additional components. Furthermore, as described above, the eye sensor 135 and the data capture sensor 140 may include field of visions that extend in opposite directions.

Conventional use of the electronic device 200 includes the display device 115 to face the user. Accordingly, the eye sensor 135 may be disposed on the side of the display device 115 to also face the user. When data included in a MRRoD is to be received, a data capture functionality may be activated. The data capture functionality may be activated in a variety of ways. For example, the data capture functionality may be a scanning viewfinder in which shape detection algorithms known in the art determine if a particular shape is a MRRoD. Accordingly, when the data capture sensor 140 detects the MRRoD within the field of vision thereof, the processor 105 of the triggering arrangement 100 may determine that the data capture functionality is to be used. Thus, the data capture functionality may be activated. In another example, the data capture functionality may be manually activated. The manual activation may also be performed in a variety of ways such as using the I/O device 120, a particular eye gesture detected by the eye sensor 135 that activates the data capture functionality, a gesture performed on the electronic device 200 (e.g., a shake detected by an accelerometer), an oral command may be spoken via the audio receiving component 145, etc. When activated, the data capture functionality may be shown on the display device 115. Specifically, the field of vision of the data capture sensor 140 including any MRRoDs may be shown on the display device 115.

When the data capture functionality is activated, the eye sensor 135 may be used to determine the MRRoD that is to be captured, particularly when multiple MRRoDs are included within the field of vision of the data capture sensor 140. The eye sensor 135 may be configured to determine movements of the eye (e.g., to activate the data capture functionality). The eye sensor 135 may further capture at least one image of the eye for the processor 105 and the data capture functionality to determine a location being seen by the user. Specifically, the eye sensor 135 may be used to determine a location being viewed on the display device 115. Conventional tracking algorithms may be used to determine the location being viewed by the user. Once the MRRoD shown on the display device 115 is determined as being seen by the user, a data capture trigger may be activated. The data capture trigger may be performed in a variety of ways. In a first example, the user may manually activate the trigger, for example, through the I/O device 120. In a second example, the user may perform an eye gesture (e.g., blinking) that is captured by the eye sensor 135 that indicates the data capture trigger is activated. In a third example, an oral command may be spoken via the audio receiving component 145. When triggered, the triggering arrangement 100 may decode the MRRoD that the user wanted by specifically looking at the MRRoD that is to be decoded.

Through incorporating the trigger arrangement 100 for the electronic device 200 such as a tablet, a more efficient data capture functionality may be performed. For example, in a conventional electronic device, if a picklist mode is enabled and the scanner is started, a MRRoD directly under the reticule will be decoded nearly immediately. This may be undesirable if the user has not properly aimed the scanner since an incorrect MRRoD may be scanned. The exemplary embodiments of the present invention allow the user to "preview" the MRRoD before decoding since the user is directly viewing the MRRoD and the eye sensor 135 is configured to determine this MRRoD as a function of the user's eye, thereby removing incorrect data captures. In another example, when decoding a specific MRRoD in a picklist mode, the user is required to manually move the scanner so that the reticule is over the correct MRRoD, thus requiring the user to physically move (e.g., body and/or hand holding the scanner). While moving the scanner to the correct MRRoD, the reticule may pass over a different barcode and a scan may be improperly performed. The exemplary embodiments of the present invention allow the user to indicate when the correct MRRoD is selected by first viewing the MRRoD and subsequently activate the data capture functionality when the identification of the MRRoD is shown to the user. In a further example, the conventional electronic device requires the user to select the MRRoD on the display device, thus requiring the user to move their hands. The exemplary embodiments of the present invention only require the user to move their eyes to select the MRRoD to decode. Accordingly, an easier, quicker, and more efficient data capture functionality may be performed with a more natural human computer interaction.

Figure 3:
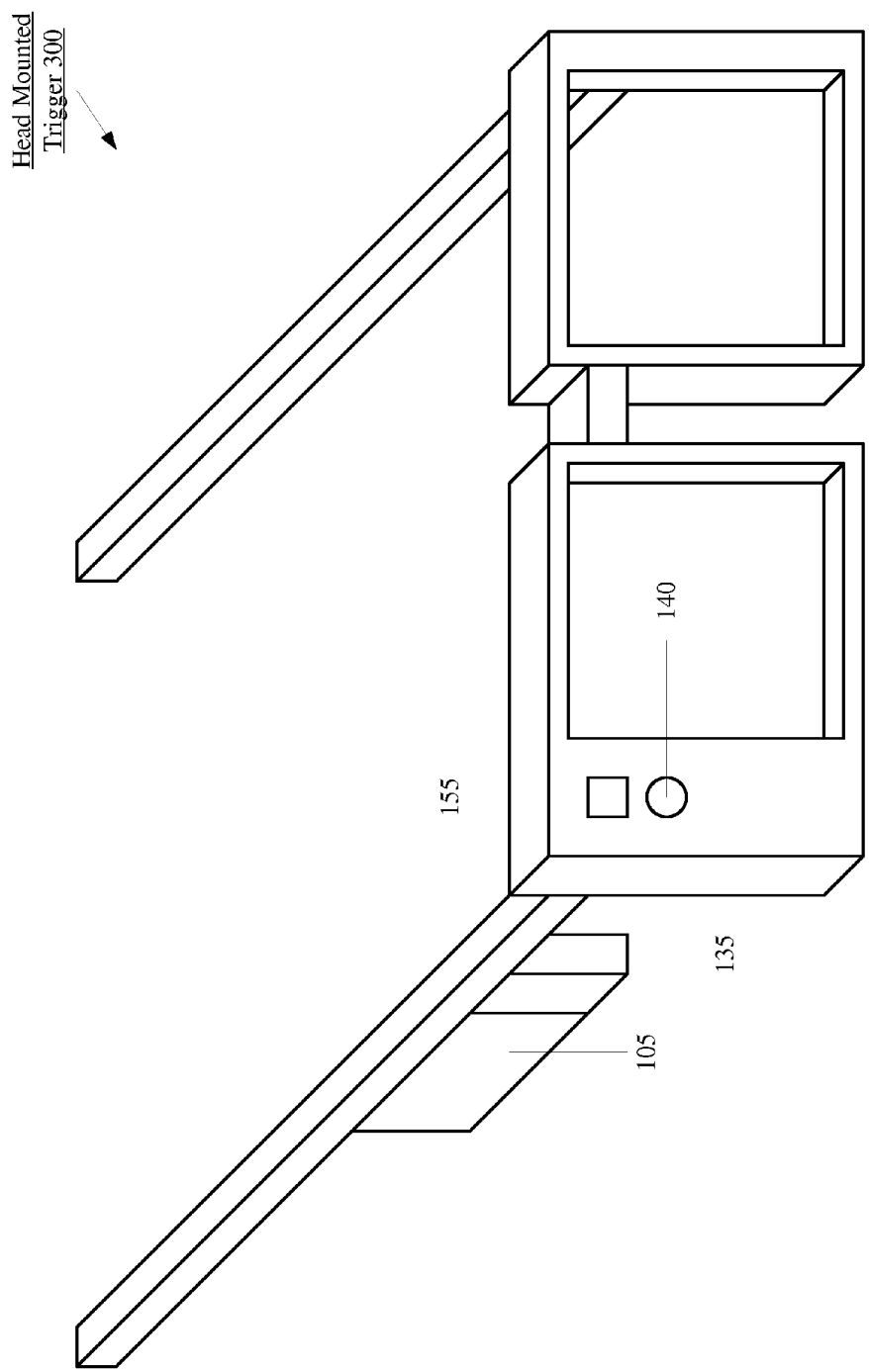
FIG. 3 is a head mounted trigger incorporating the trigger arrangement of FIG. 1 in accordance with some embodiments.

FIG. 3 is a head mounted trigger 300 incorporating the trigger arrangement 100 of FIG. 1 in accordance with some embodiments. As illustrated in FIG. 3, the head mounted trigger 300 may be in the form of eyeglasses. However, it should be noted that the use of eyeglasses is only exemplary. Specifically, the head mounted trigger 300 may represent any mount in which the trigger arrangement 100 is incorporated. As discussed above, the mount may be for the head (e.g., eyeglasses, headband, etc.), the wrist, etc. The head mounted trigger 300 may also include the components described above for the triggering arrangement 100 and the electronic device 200 such as the processor 105 and the lighting component 155. The processor 105 may be disposed within a housing of the head mounted trigger 100 or, as illustrated in FIG. 3, may be disposed along one of the temples. The head mounted trigger 300 may further include the eye sensor 135 having a field of vision disposed perpendicularly to a field of vision of the user. Specifically, as illustrated in FIG. 3, the eye sensor 135 may be disposed adjacent the processor 105 on the same temple. However, it should be noted that the eye sensor 135 may be disposed at any location (e.g., on the other temple of the eyeglasses) oriented so that the field of vision thereof is configured to capture data related to the eye of the user. The head mounted trigger 300 may additionally include the data capture sensor 140. As discussed above, the data capture sensor 140 may be disposed so that the field of vision coincides with the field of vision of the user. Accordingly, the data capture sensor 140 may be disposed on an outer facing side of the rims of the eyeglasses. It should be noted that the head mounted trigger 300 may further be equipped with other components such as the I/O device, the audio receiving component, and the audio transmitting component as discussed above.

With the above described orientation of the components on the head mounted trigger 300, a substantially similar data capture functionality as discussed above with reference to FIGS. 2A-2B may be performed. Initially, the data capture functionality may be activated via any of the above described ways. Since the head mounted trigger 300 does not include the display device 115, the eye sensor 135 may be configured to determine the location in which the MRRoD to be captured is physically disposed. Once determined, the MRRoD may be captured using the data capture sensor 140 via any of the above described ways.

It should be noted that the eye sensor 135 determining the location in which the MRRoD is physically disposed is only exemplary. In another exemplary embodiment, the head mounted trigger 300 may incorporate holographic components so that a 2-dimensional or 3-dimensional image is shown to the user of the field of vision of the data capture sensor 140. In such an embodiment, the eye sensor 135 may determine the location on the holographic image and further determine the location in which the MRRoD is disposed for the data capture functionality. In yet another exemplary embodiment, the head mounted trigger 300 may incorporate a display device on one of the lenses of the eyeglasses. In such an embodiment, the eye sensor 135 may determine the location on the lens showing the field of vision of the data capture sensor 140 to further determine the location in which the MRRoD is disposed for the data capture functionality.

Through incorporating the trigger arrangement 100 for the head mounted trigger 300, a more efficient data capture functionality may also be performed. For example, in a conventional electronic scanning device, the user is required to hold the device. Through using a mount, the exemplary embodiments of the present invention allow for a hands-free data capture functionality, thereby increasing the ease of use. In another example, the conventional electronic device requires the user to pick up, aim, trigger, and put down the device while a stationary conventional scanning device requires the user to perform these actions with regard to the MRRoD. The exemplary embodiments of the present invention allow for these actions to be performed without any movement except for the eye of the user. In a further example, from the elimination of the further movements and actions required of the user, the operation of the data capture functionality has a more natural human computer interaction.

It should be noted that the incorporation of the trigger arrangement 100 in the electronic device 200 and the head mounted trigger 300 is only exemplary. The trigger arrangement 100 may be incorporated in a variety of other manners. As described above, the components of the trigger arrangement 100 may be separated and a communication arrangement may be used to exchange data between the components. According to a further exemplary embodiments of the present invention, the trigger arrangement 100 may be incorporated in an environment. For example, the environment may be a warehouse, a retail location, a mail room, etc. Those skilled in the art will understand that in such environments, there may be a great number of MRRoDs disposed at various different locations. With a plurality of eye sensors 135 may be disposed at predetermined locations in the environment, a location being viewed by the user may be determined. Furthermore, with the use of multiple eye sensors 135, a more accurate location may be determined through extrapolation from the different eye sensors 135. The user may have an electronic device including the data capture sensor 140 (e.g., handheld or mounted). By triggering the data capture functionality and receiving the location being viewed by the user from the plurality of eye sensors 135, the correct MRRoD may be decoded.

Figure 4:
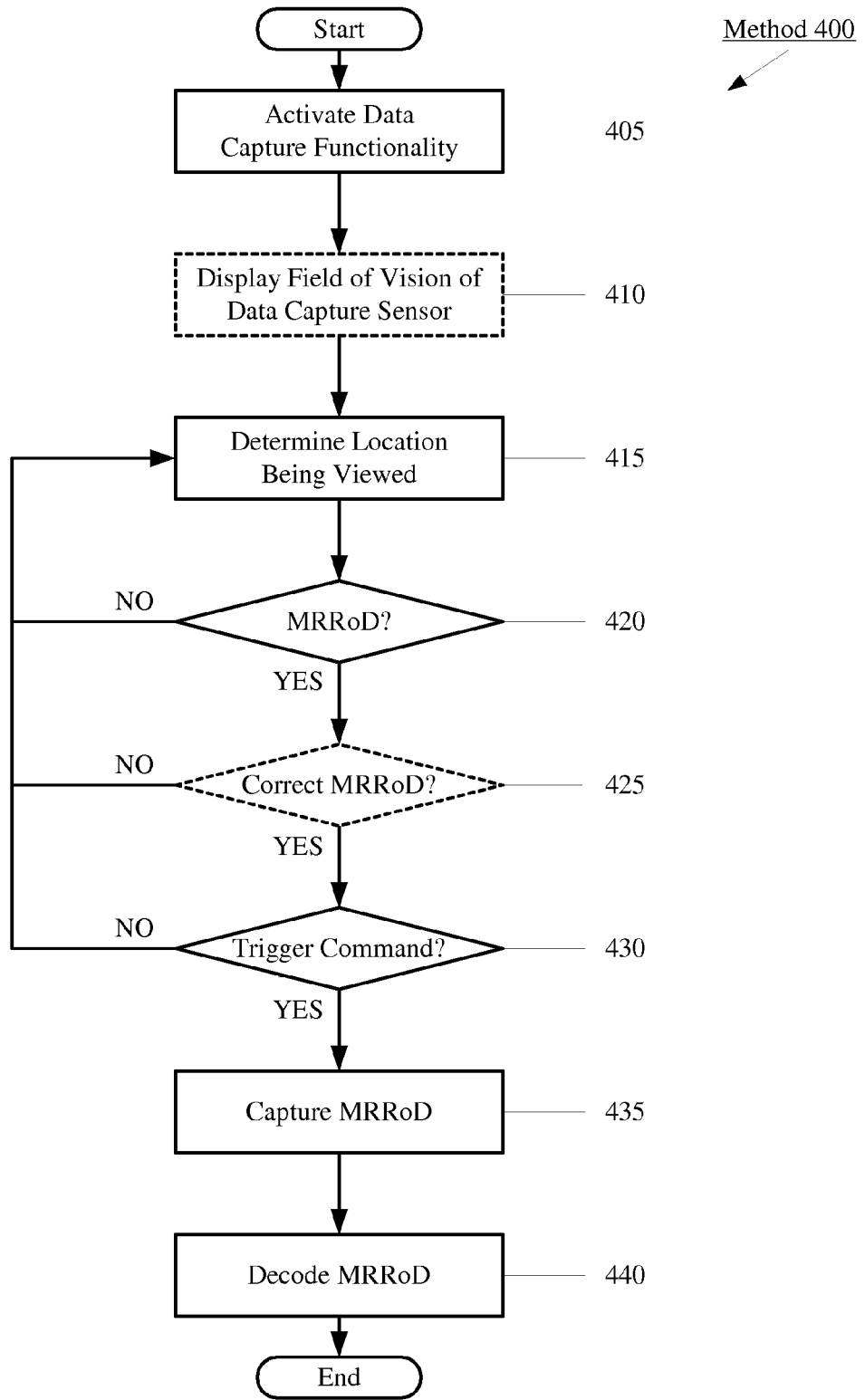
FIG. 4 is a flowchart of a method for activating a data capturing functionality in accordance with some embodiments.

FIG. 4 is a flowchart of a method 400 for activating a data capturing functionality in accordance with some embodiments. The method 400 relates to the data capturing functionality when the trigger arrangement 100 is used. The method 400 will be described with reference to the trigger arrangement 100 of FIG. 1, the electronic device 200 of FIG. 2, and the head mounted trigger 300 of FIG. 3.

In step 405, the data capture functionality is activated. As discussed above, the data capture functionality may be activated in a variety of ways. In a first example, when the trigger arrangement 100 is incorporated with the electronic device 200, the data capture sensor 140 may use shape recognition algorithms to determine the presence of a MRRoD within the field of vision thereof to indicate the activation of the data capture functionality. In a second example, the eye sensor 135 may capture an eye based gesture such as blinking, winking, multiples/combinations of blinking and/or winking, time based blinking/winking (e.g., blinking for 2 seconds), etc. to indicate the activation of the data capture functionality. In a third example, via the audio receiving component 145, an oral command may be uttered to activate the data capture functionality. In a fourth example, via the I/O device 120, an input may be entered to activate the data capture functionality. In a fifth example, a physical button, touch interface, trigger, sensor, mind reading device, etc. connected via a wired or wireless communication arrangement may be used to activate the data capture functionality.

In step 410, the field of vision of the data capture sensor 140 may optionally be shown on the display device 115. As discussed above, when the data capture functionality is activated, an image of the field of vision of the data capture sensor 140 may be shown on the display device 115 including at least one MRRoD for the user to focus thereupon.

Thus, when the trigger arrangement 100 is incorporated with the electronic device 100, the display device 115 may show this image. Also as discussed above, the head mounted trigger 200 may be configured with showing this image such as on the lens of the eyeglasses, using holography, etc.

In step 415, the eye sensor 135 determines the location being viewed by the user. Using conventional recognition algorithms, the eye sensor 135 may capture images for the processor 105 to determine the location being viewed. Accordingly, whether being viewed on the display device 115 or on a physical surface in which the MRRoD may be disposed, the location is determined. As discussed above, multiple eye sensors 135 may also be used to determine a more accurate location being viewed by the user. It should be noted that the electronic device 200 and/or the head mounted trigger 300 may also incorporate more than one eye sensor 135.

In step 420, a determination is made whether the location being viewed includes a MRRoD. That is, there is a possibility that the user is not currently viewing a MRRoD. When there is no MRRoD within the location being viewed, the method 400 returns to step 415. However, if a MRRoD is present in the location being viewed, the method 400 continues to step 425. In step 425, a determination is optionally made whether the correct MRRoD is being viewed. As discussed above, the surface including the MRRoD may include a plurality of MRRoDs. The data capture functionality may request confirmation that the MRRoD selected (e.g., on the image of the field of vision of the data capture sensor 140) is the correct MRRoD. It should be noted that step 425 may not be optional to verify that all data captures are only performed on proper MRRoDs. It should also be noted that step 425 may be tacit such as the user mentally verifying the correct MRRoD.

In step 430, a determination is made whether the trigger command is received. As discussed above, the trigger command may be received in a variety of ways. For example, any of the manners described above to activate the data capture functionality may also be used to activate the trigger to capture the MRRoD. Thus, an eye based gesture, a sound activation, an external hardware based activation, etc. may be used in step 430.

In step 435, the MRRoD which has been confirmed as being the correct MRRoD being viewed by the user is captured using the data capture sensor 140. Thus, in step 440, the MRRoD is decoded.

The exemplary embodiments of the present invention provide a trigger arrangement configured to automatically determine a location being viewed by the user so that a correct MRRoD is captured and the data encoded therein is decoded. The trigger arrangement includes an eye sensor having a field of vision oriented to view the eye of the user. Using tracking algorithms, the location being viewed by the user is determined. The trigger arrangement also includes a data capture sensor having a field of vision oriented to view and capture a location in which the MRRoD may be disposed. The data capture sensor is also configured to capture the MRRoD so that the data encoded therein is decoded. The exemplary embodiments of the present invention provide a more natural human computer interaction with a more efficient means of capturing a MRRoD.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, comprising:
   obtaining first image data within a first vision field of a first sensor;
   determining a first area viewed by a user's eye as a function of the first image data;
   activating a display of an image of a second vision field of a second sensor in response to recognizing a shape corresponding to a target machine readable representation of data (MRRoD) within the second vision field of the second sensor;
   obtaining second image data within the second vision field of the second sensor;
   determining a second area captured within the second vision field as a function of the second image data;
   determining disposition data of the first area within the second area;
   determining presence of the target MRRoD in the first area viewed by the user's eye upon determining the disposition of the first area within the second area, wherein the target MRRoD is present in the second area;
   after activating the display of the image of the second vision field, detecting, via the first sensor, a data capture trigger command comprising at least one eye gesture for initiating a capture of the target MRRoD within the displayed image; and
   when the data capture trigger command is received, capturing the target MRRoD, using the second sensor, as a function of the disposition of the first area viewed by the user's eye within the second area representing the second vision field of the second sensor.

2. The method of claim 1, wherein the first sensor is one of a camera and a motion sensing device, and the second sensor is one of a 2-dimensional camera, a 3-dimensional camera, a 2-dimensional radio frequency identification (RFID) positional sensor, a near field communication (NFC) positional sensor, and a scanning device.

3. The method of claim 1, further comprising:
   displaying the image of the second vision field on a display device.

4. The method of claim 1, wherein the first area is on a viewing surface of a display device.

5. The method of claim 1, wherein the first and second sensors are incorporated in head mounted eyeglasses.

6. The method of claim 5, wherein the first sensor is disposed on one of a pair of temples of the eyeglasses and the second sensor is disposed on an outer facing side of the rims of the eyeglasses.

7. The method of claim 1, further comprising detecting a plurality of MRRoDs, wherein the plurality of MRRoDs includes the target MRRoD.

8. The method of claim 7, further comprising selecting the target MRRoD from the plurality of MRRoDs using the data capture trigger command.

9. A trigger arrangement, comprising:
a first sensor configured to obtain first image data within a first vision field, a first area viewed by an eye of a user being determined as a function of the first image data; and
a second sensor configured to obtain second image data within a second vision field, a second area captured within the second vision field being determined as a function of the second image data,
wherein a display of an image of the second vision field of the second sensor is activated in response to recognizing a shape corresponding to a target machine readable representation of data (MRRoD) within the second vision field of the second sensor, disposition data of the first area within the second area is determined, and presence of the target MRRoD in the first area viewed by the user's eye is determined upon determining the disposition of the first area within the second area, wherein the target MRRoD is present in the second area, so that, after the display of the image of the second vision field is activated, a data capture trigger command comprising at least one eye gesture for initiating a capture of the target MRRoD within the displayed image is detected via the first sensor, the second sensor being configured to capture the target MRRoD as a function of the disposition of the first area viewed by the user's eye within the second area representing the second vision field of the second sensor.

10. The triggering arrangement of claim 9, wherein the first sensor is one of a camera and a motion sensing device and the second sensor is one of a 2-dimensional camera, a 3-dimensional camera, a 2-dimensional radio frequency identification (RFID) positional sensor, a near field communication (NFC) positional sensor, and a scanning device.

11. The triggering arrangement of claim 9, wherein the second sensor captures an image of the second area.

12. The triggering arrangement of claim 11, further comprising:
a display device configured to display the image of the second area.

13. The triggering arrangement of claim 11, wherein the first area is on a viewing surface of a display device.

14. The triggering arrangement of claim 9, wherein the first and second sensors are incorporated in head mounted eyeglasses.

15. The triggering arrangement of claim 14, wherein the first sensor is disposed on one of a pair of temples of the eyeglasses and the second sensor is disposed on an outer facing side of rims on the eyeglasses.

16. The triggering arrangement of claim 9, wherein the second sensor is configured to detect a plurality of MRRoDs, wherein the plurality of MRRoDs includes the target MRRoD.

17. The triggering arrangement of claim 16, wherein the data capture trigger command selects the target MRRoD from the plurality of MRRoDs.

18. An electronic device, comprising:
a first sensor configured to obtain first image data within a first vision field, a first area viewed by an eye of a user being determined as a function of the first image data;
a second sensor configured to obtain second image data within a second vision field, a second area captured within the second vision field being determined as a function of the second image data; and
a processor configured to activate a display of an image of the second vision field of the second sensor in response to recognizing a shape corresponding to a target machine readable representation of data (MRRoD) within the second vision field of the second sensor, determine disposition of the first area within the second area and, after activating the display of the image of the second vision field, detect, via the first sensor, a data capture trigger command comprising at least one eye gesture for initiating a capture of the target MRRoD within the displayed image,
wherein the processor determines the presence of the target MRRoD in the first area viewed by the user's eye upon determining the disposition of the first area within the second area, wherein the target MRRoD is present in the second area,
wherein, upon receiving the data capture trigger command, the second sensor is configured to capture the target MRRoD as a function of the disposition of the first area viewed by the user's eye within the second vision field of the second sensor.

19. A non-transitory computer readable storage medium including a set of instructions executable by a processor, the set of instructions operable to:
obtain first image data within a first vision field of a first sensor;
determine a first area viewed by a user's eye as a function of the first image data;
activate a display of an image of a second vision field of a second sensor in response to recognizing a shape corresponding to a target machine readable representation of data (MRRoD) within the second vision field of the second sensor;
obtain second image data within the second vision field of the second sensor;
determine a second area captured within the second vision field as a function of the second image data;
determine disposition of the first area within the second area;
determine presence of the target MRRoD in the first area viewed by the user's eye upon determining the disposition of the first area within the second area, wherein the target MRRoD is present in the second area;
after activating the display of the image of the second vision field, detect, via the first sensor, a data capture trigger command comprising at least one eye gesture for initiating a capture of the target MRRoD within the displayed image; and
when the data capture trigger command is received, capture the target MRRoD, using the second sensor, as a function of the disposition of the first area viewed by the user's eye within the second area representing the second vision field of the second sensor.

* * * * *